US007701615B2

(12) United States Patent
Furukawa et al.

(10) Patent No.: US 7,701,615 B2
(45) Date of Patent: Apr. 20, 2010

(54) IMAGE FORMING METHOD AND IMAGE FORMING APPARATUS

(75) Inventors: Toshio Furukawa, Nagoya (JP); Masashi Suzuki, Nagoya (JP); Seiji Yoshida, Mizuho (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 47 days.

(21) Appl. No.: 11/525,040

(22) Filed: Sep. 22, 2006

(65) Prior Publication Data

US 2007/0070459 A1    Mar. 29, 2007

(30) Foreign Application Priority Data

Sep. 26, 2005   (JP) .............. 2005-278225

(51) Int. Cl.
*G06K 15/00* (2006.01)
*H04N 1/46* (2006.01)
(52) U.S. Cl. ...................... 358/3.13; 358/504
(58) Field of Classification Search ............. 358/1.9, 358/3.03, 504; 399/28
See application file for complete search history.

(56) References Cited

U.S. PATENT DOCUMENTS

| | | | | |
|---|---|---|---|---|
| 4,682,216 A | * | 7/1987 | Sasaki et al. ............ 358/529 |
| 4,736,254 A | * | 4/1988 | Kotera et al. ........... 358/3.23 |
| 5,680,529 A | * | 10/1997 | Matsumoto .............. 345/668 |
| 5,688,622 A | * | 11/1997 | Ito et al. ................ 430/122.4 |
| 5,796,929 A | * | 8/1998 | Shu et al. ................. 358/1.9 |
| 6,164,745 A | * | 12/2000 | Nagoshi et al. ........... 347/15 |
| 6,512,598 B2 | * | 1/2003 | Fujita et al. ............. 358/3.09 |
| 2002/0089514 A1 | * | 7/2002 | Kitahara et al. ........ 345/600 |
| 2002/0186383 A1 | * | 12/2002 | Obrador .................. 358/1.2 |
| 2004/0027451 A1 | * | 2/2004 | Baker ....................... 348/46 |
| 2004/0081477 A1 | * | 4/2004 | Maebashi et al. ........ 399/49 |

FOREIGN PATENT DOCUMENTS

JP       11-069180       3/1999
JP       2000-062250     2/2000

* cited by examiner

*Primary Examiner*—Mark K Zimmerman
*Assistant Examiner*—Mesfin Getaneh
(74) *Attorney, Agent, or Firm*—Banner & Witcoff, Ltd

(57) ABSTRACT

Whether or not a density of black is a predetermined value or more is judged, and when it is judged to be the predetermined value or more, a resolution characteristic is changed to an improved resolution characteristic compared to the resolution characteristic used in a case in which a judgment result shows a value under the predetermined value. When the density of black is deeper, the resolution characteristic is improved, and therefore black is prevented from becoming in a so-called void state. Accordingly, the color close to black such as four-color black can be stably and excellently formed. In addition, when the density of black is the value under the predetermined value, the resolution characteristic lower than this value is used, and therefore dots can be stably formed and an excellent gradation property can be achieved.

24 Claims, 10 Drawing Sheets

F I G. 2
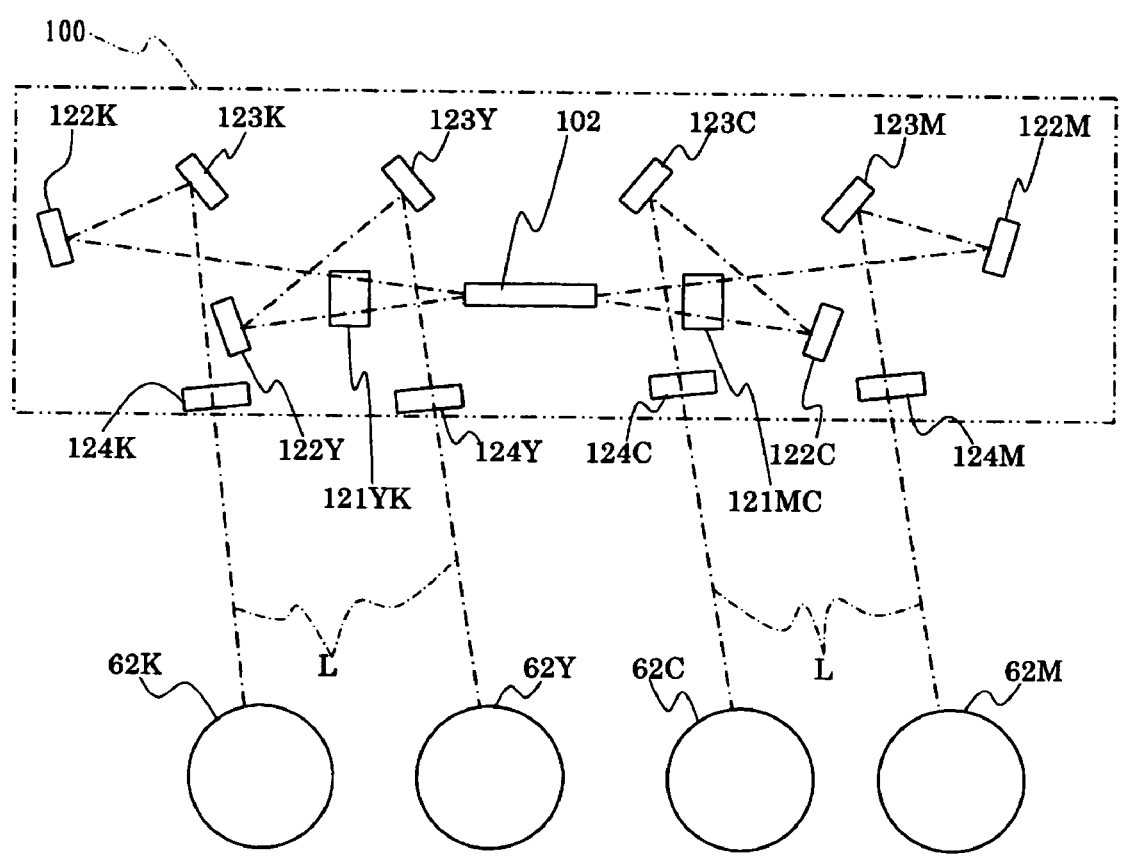

F I G. 3
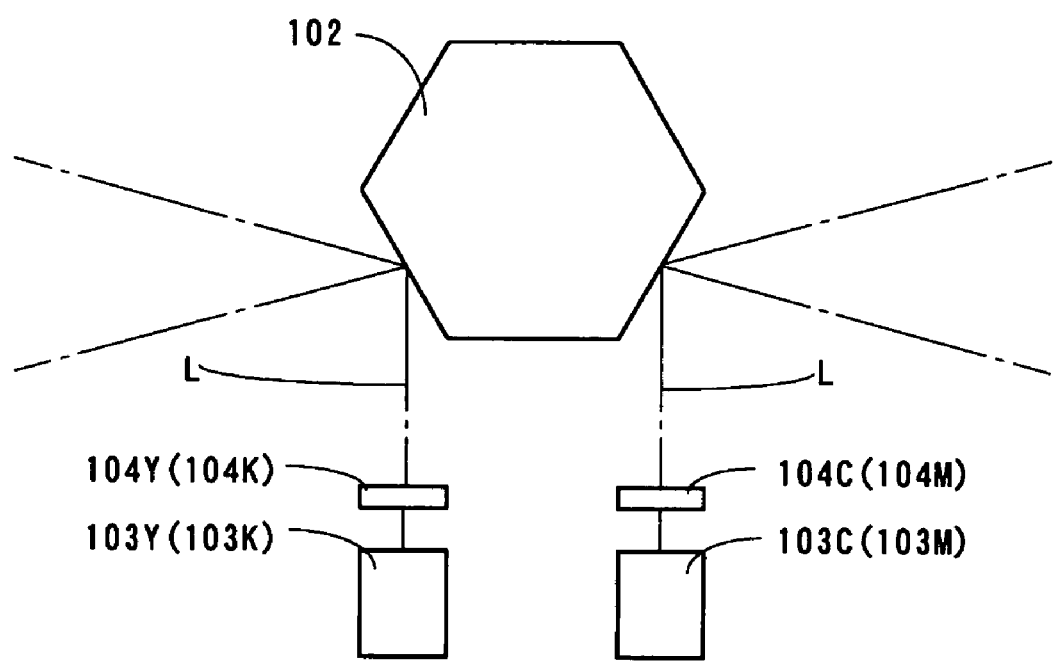

F I G. 8A

F I G. 8B

F I G. 9A

F I G. 9B

IMAGE FORMING METHOD AND IMAGE FORMING APPARATUS

CROSS-REFERENCE TO RELATED APPLICATIONS

This Nonprovisional application claims priority under 35 U.S.C. §119(a) on Patent Application No. 2005-278225 filed in Japan on Sep. 26, 2005, the entire contents of which are hereby incorporated by reference.

BACKGROUND OF THE INVENTION

1. Field of the Invention

The present invention relates to an image forming method and apparatus for forming an image with an electrophotographic method on a medium (recording paper) to be recorded by using toner. More specifically, the present invention relates to an image forming method and apparatus for forming an image in accordance with image data corresponding to black and other plurality of colors and a predetermined resolution characteristic.

2. Description of Related Art

As a conventional image forming apparatus of this kind, there is given examples such as an image forming apparatus comprising: a latent image forming unit for forming an electrostatic latent image corresponding to each color on an image carrier, in accordance with image data corresponding to black and other plurality of colors (such as yellow, magenta, and cyan) and a predetermined resolution characteristic; a developing unit for developing the electrostatic latent image formed on the image carrier by the latent image forming unit by adsorbing toner of each color thereon; and a transfer unit for transferring the toner adsorbed to the image carrier by the developing unit, to a medium (recording paper) to be recorded.

According to the conventional image forming apparatus thus constituted, in accordance with the image data corresponding to the aforementioned each color and the resolution characteristic (such as a dither matrix), the latent image forming unit forms the electrostatic latent image on the image carrier, and the developing unit performs development by adsorbing the toner of the aforementioned each color on the electrostatic latent image. In this way, by transferring the toner adsorbed on the image carrier to the medium (recording paper) to be recorded by the transfer unit, toners of the aforementioned each color are arranged on the medium to be recorded in a predetermined positional relation, and a color image is formed on the medium to be recorded.

In addition, the conventional image forming apparatus of this kind proposes that beam diameters for forming the electrostatic latent image is differentiated between a case of forming black color (referred to as three-color black hereafter) by transferring three colors of yellow, magenta, and cyan to adjacent positions on the medium to be recorded, and a case of forming black color (referred to as monochromatic black hereafter) by transferring only toner of black to the medium to be recorded (for example see Japanese Patent Application laid-Open No. 2000-62250).

Incidentally, a combination of the aforementioned three-color black and the monochromatic black can be considered. Specifically, there is a conceivable case such that after forming three-color black by transferring yellow, magenta, and cyan to the adjacent positions, the toner of black is further transferred thereon to obtain high density black color (referred to as four-color black hereafter). However, a problem is involved in this case as follows. Namely, since the toner of each color are generally charged with the same polarity, when the toner of black is transferred on the three-color black, electrostatic repulsion of the toners of yellow, magenta, and cyan is exerted on the toner of black. Therefore, a density of black is deteriorated in a portion where the toner of black is flipped by the aforementioned repulsion.

BRIEF SUMMARY OF THE INVENTION

As described above, in order to prevent the toner of black from being flipped in the four-color black, a method of improving the resolution characteristics by fining the dither matrix, etc, is taken into consideration. However, in the case of improving the resolution characteristic, the problem involved therein is that it becomes difficult to stably form dots, and a gradation property is deteriorated.

In view of the above-described circumstances, the present invention is provided, and a main object of the present invention is to provide an image forming method and apparatus capable of stably forming multiple-color black and excellent in gradation property.

In order to achieve the above-described object, the present invention provides the image forming method for forming an image of black by an image forming apparatus which comprises: a latent image forming unit that forms an electrostatic latent image corresponding to each color on an image carrier, in accordance with image data corresponding to black and a plurality of colors other than black and a predetermined resolution characteristic; a developing unit that adsorbs toner of the each color on the electrostatic latent image formed on the image carrier to develop a toner image; and a transfer unit that transfers the toner adsorbed on the image carrier by the developing unit to a medium to be recorded, and is characterized by comprising the steps of: judging whether or not a density of black is a predetermined value or more, based on the image data; and when the judgment result shows that the density of black is the predetermined value or more, changing the resolution characteristic to a higher resolution characteristic compared to the resolution characteristic used in a case in which the judgment result shows that the density of black is a value under the predetermined value.

Also, the image forming apparatus according to the present invention is an image forming apparatus and is characterized by comprising: a latent image forming unit that forms an electrostatic latent image corresponding to each color on an image carrier in accordance with image data corresponding to black and a plurality of colors other than black and a predetermined resolution characteristic; a developing unit that adsorbs toner of said each color on the electrostatic latent image formed on said image carrier by said latent image forming unit to develop a toner image; a transfer unit that transfers the toner adsorbed on said image carrier by said developing unit to a medium to be recorded; a judging unit that judges whether or not a density of black is a predetermined value or more, based on said image data; and a resolution characteristic change unit that changes said resolution characteristic to a higher resolution characteristic compared to the resolution characteristic used in a case in which said judging unit judges that the density of black is a value under said predetermined value, when said judging unit judges that the density of black is said predetermined value or more.

In the image forming method and apparatus according to the present invention, an electrostatic latent image is formed on an image carrier in accordance with image data corresponding to each color and a resolution characteristic, and development to a toner image is performed by adsorbing toner of each color on the electrostatic latent image. When the toner of the toner image thus developed is transferred to the medium (recording paper) to be recorded, the toner of each color is arranged on the medium to be recorded in a predetermined positional relation, and a color image can be formed on the medium to be recorded.

Further, when judging whether or not the density of black is predetermined value or more, and when it is judged to be the predetermined value or more, the resolution characteristic is changed to a higher resolution characteristic compared to the resolution characteristic used in a case in which a judgment result shows that the density of black is a value under the predetermined value. As a result, when the density of black is higher, the resolution characteristic is improved accordingly, thus preventing a failure such as void occurring when the toner of black is flipped by the toner of other color. Accordingly, it becomes possible to stably and excellently form color such as four-color black which is close to black. In addition, when the density of black is the value under the predetermined value, the resolution characteristic lower than this value is used. Therefore, by stably forming the dots, an excellent gradation property can be achieved.

The above and further objects and features of the invention will more fully be apparent from the following detailed description with accompanying drawings.

BRIEF DESCRIPTION OF THE SEVERAL VIEWS OF THE DRAWINGS

FIG. 2 is a schematic sectional view showing the outlined constitution of a scanner unit of the printer of the embodiment 1 to which the present invention is applied;

FIG. 3 is a schematic plan view showing a constitution of an essential portion in the vicinity of a polygon mirror of the scanner unit of the printer of the embodiment 1 to which the present invention is applied;

FIG. 8A and FIG. 8B are explanatory views showing a low resolution dither matrix and processing data thereof;

FIG. 9A and FIG. 9B are explanatory views showing a high resolution dither matrix and the processing data thereof.

DETAILED DESCRIPTION OF THE PRESENT INVENTION

Preferred embodiments of the present invention will be explained with reference to the drawings hereafter.

Embodiment 1

Figure 1:
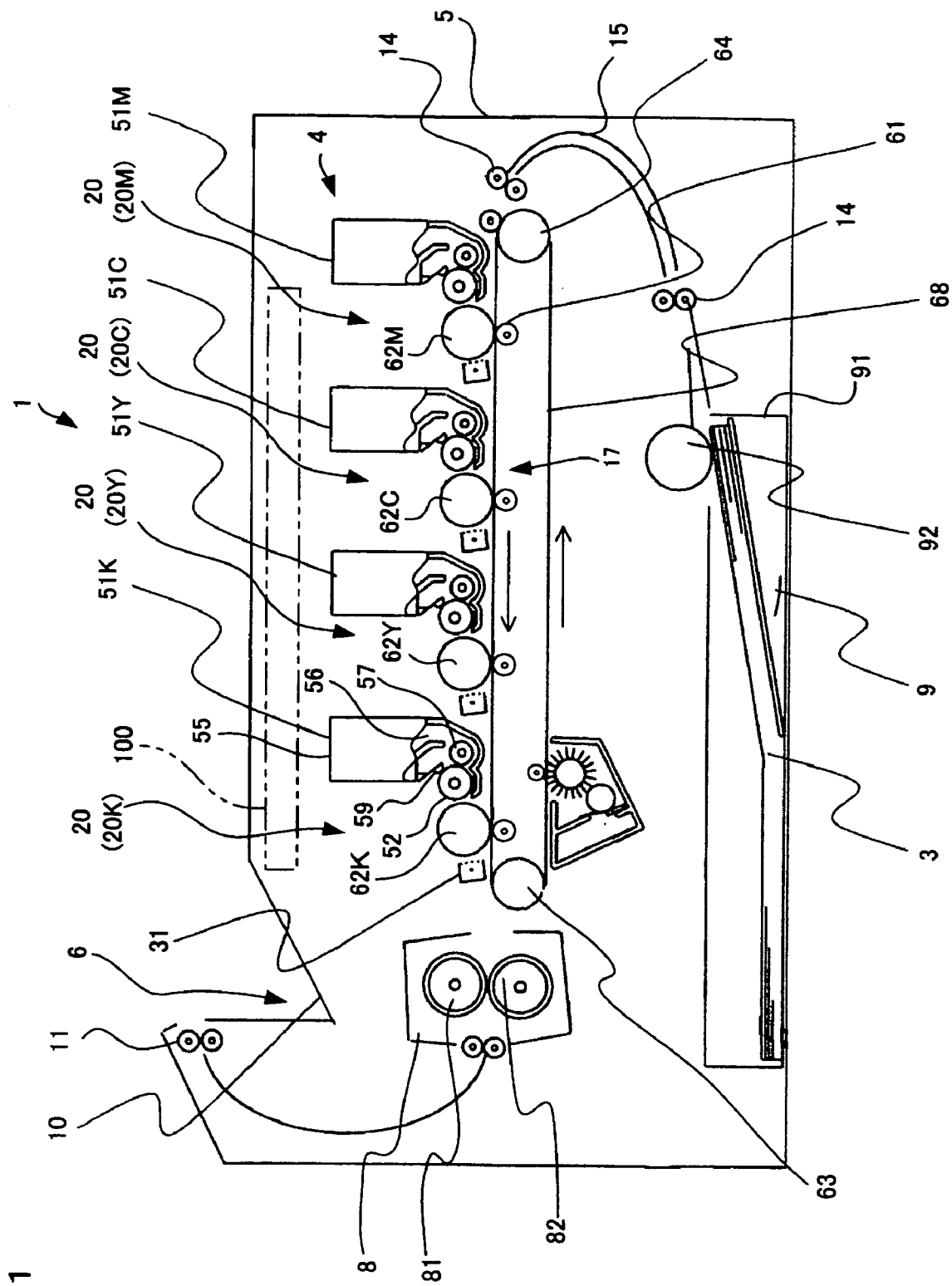
FIG. 1 is a schematic sectional view showing an outlined constitution of a printer of an embodiment 1 to which the present invention is applied.

First, an explanation will be given to an overall constitution of a printer to which the present invention is applied. FIG. 1 is a schematic sectional view showing an outlined constitution of the printer to which the present invention is applied.

In FIG. 1, a printer 1 is a tandem-type color laser printer having four image forming units 20 as will be described later arranged in parallel with each other in a substantially horizontal direction in the normal using condition. The printer 1, in a body casing 5, is provided with a paper feeding unit 9 for feeding recording paper 3 as a medium to be recorded, an image forming section 4 for forming an image on the fed recording paper 3, and a paper discharging unit 6 for discharging the recording paper 3 on which an image is formed.

The paper feeding unit 9 is provided at a bottom portion in the body casing 5. The paper feeding unit 9 has a paper feeding tray 91 installed removably from the front side (right side in FIG. 1) of the body casing 5. Further, the paper feeding unit 9 has a paper feeding roller 92 provided on a front upper side of the paper feeding tray 91, and conveying rollers 14 provided in an upper portion of the paper feeding roller 92 and on a downstream side of the paper feeding roller 92 in the conveying direction of the recording paper 3 (in some cases, the downstream side in the conveying direction of the recording paper 3 is abbreviated to a downstream side, and an upstream side in the conveying direction of the recording paper 3 is abbreviated to an upstream side).

Recording papers 3 are stacked in the paper feeding tray 91. An uppermost recording paper 3 is sequentially fed toward the conveying rollers 14 by a rotation of the paper feeding roller 92, and the recording paper 3 is sent from the conveying rollers 14 to a position (transfer position) between a conveying belt 68 and each photosensitive drum 62.

In addition, a guide member 15 arranged in a vertical direction is provided between the paper feeding roller 92 and the conveying belt 68. In addition, a pair of conveying rollers 14 are provided in each inlet and outlet of the guide member 15. By this structure, the recording paper 3 fed by the paper feeding roller 92 is sent to the position between the conveying belt 68 and the photosensitive drums 62 by the guide member 15.

The image forming section 4 is provided in a middle portion of the body casing 5. The image forming section 4 has image forming units 20Y, 20C, 20M, 20K for forming an image, a transfer unit 17 for transferring the image formed by each image forming unit 20 to the recording papers 3, and a fixing unit 8 for heating/pressing the image transferred to the recording papers 3 and fixing them to the recording papers 3. Note that subscripts of the Y, M, C, K show each color of yellow (Y), magenta (M), cyan (C), and black (K). However, when they need not to be distinguished individually, the subscripts are omitted.

Each image forming unit 20Y, 20M, 20C, 20K has photosensitive drum 62Y, 62M, 62C, 62K, respectively as an image carrying medium. Each image forming unit 20 is constituted by disposing around each photosensitive drum 62 an electrifier 31 for charging the photosensitive drums 62, and a developing cartridge 51 as a developing unit for adsorbing toner (developing agent) on the photosensitive drums 62.

The electrifier 31 is an electrifier of Scorotron type for positive electrostatic charge for generating a corona discharge from an electrifying wire compose of tungsten, etc, to uniformly charge the surface of the photosensitive drums 62 to be positive in the polarity by corona discharge.

Moreover, in an upper portion of the four image forming units 20, a scanner unit 100 is disposed as an latent image forming unit for forming latent images on the photosensitive drums 62 by individually exposing laser beams L (see FIG. 2). The constitution of the scanner unit 100 will be described later in detail. Electrostatic latent images are formed on the surfaces of the photosensitive drums 62 by an exposure to the laser beams L.

The developing cartridge 51 has a developing casing 55. There are provided a hopper 56, a feeding roller 57, a developing roller 52, and a layer thickness regulating blade 59 in the developing casing 55. The hopper 56 is formed as an internal space of the developing casing 55. Then, the toner of each color of yellow (Y), magenta (M), cyan (C), and black (K) is stored in the hopper 56, for each image forming unit 20.

Namely, the aforementioned four developing cartridges 51 are constituted of a developing cartridge 51Y having toner of yellow (Y) stored in the hopper 56, a developing cartridge 51M having toner of magenta (M) stored in the hopper 56, a developing cartridge 51C having toner of cyan (C) stored in the hopper 56, and a developing cartridge 51K having toner of black (K) stored in the hopper 56. In addition, in the embodiment 1, a positive charge type nonmagnetic one-component toner is used as the toner of each color. In addition, the toner used in the embodiment 1 is a so-called polymerization toner formed by adding a publicly-known colorant to a styrene-acrylic resin formed in a sphere by suspension polymerization.

The feeding roller 57 is disposed on a lower direction of and obliquely backside of the hopper 56. The feeding roller 57 is formed with a metal roller shaft being covered with a roller portion composed of a conductive sponge member. The feeding roller 57 is rotatably supported so as to rotate in an opposite direction of the developing roller 52 in a nip portion opposite to and in contact with the developing roller 52.

The developing roller 52 is rotatably disposed at a position opposite to and in contact with the feeding roller 57. The developing roller 52 is formed in such a manner that the metal roller shaft is covered with the roller portion composed of a conductive elastic member such as a rubber material.

The toner fed to the developing roller 52 by the feeding roller 57 is subjected to positive triboelectric charge between the feeding roller 57 and the developing roller 52. The toner fed on the developing roller 52 is further sufficiently subjected to triboelectric charge by the layer thickness regulating blade 59 provided so as to be in contact with the developing roller 52, accompanying a rotation of the developing roller 52. As a result, the toner is carried on the developing roller 52 as a thin layer of fixed thickness.

After uniformly subjected to positive charge by the electrifier 31, the surfaces of the photosensitive drums 62 are exposed to laser beams L (see FIG. 2), and the electrostatic latent image based on a predetermined image data is thereby formed. Subsequently, by the rotation of the developing roller 52, the toner carried on the developing roller 52 and subjected to positive charge is opposed to and in contact with the photosensitive drums 62. At this time, the toner is fed to the electrostatic latent image previously formed on the surfaces of the photosensitive drums 62, i.e. a portion where a potential is dropped by being exposed to the laser beams L of the surfaces of uniformly positively charged photosensitive drums 62. Thus, since the toner is selectively carried on the portion of the electrostatic latent image on the surfaces of the photosensitive drums 62, the toner image is formed by making the electrostatic latent image become visible (reversal development is achieved).

The transfer unit 17 is provided so as to oppose to the photosensitive drums 62 in an obliquely lower direction of the developing cartridges 51. The transfer unit 17 has a conveying belt driving roller 63, a conveying belt driven roller 64, a conveying belt 68 which is an endless belt wound around the conveying belt driving roller 63 and the conveying belt driven roller 64, and transfer rollers 61.

The conveying belt driven roller 64 is disposed on the further upstream side of the photosensitive drum 62M of the image forming unit 20M on the uppermost stream side in the conveying direction of the recording paper 3 and on an upper front side of the paper feeding roller 92. In addition, the conveying belt driving roller 63 is disposed on the further downstream side of the photosensitive drum 62K of the image forming unit 20K of black (K) arranged on the lowermost side in the conveying direction of the recording paper 3, and in a lower direction of and obliquely front side of the fixing unit 8. Also, the conveying belt 68 is disposed, with an outside surface being opposed to and in contact with all photosensitive drums 62 of each image forming unit 20.

Then, by driving the driving roller 63, the conveying belt 68 is moved, and as a result, the conveying belt driven roller 64 is driven accordingly. Therefore, the conveying belt 68 performs encircling movement between the conveying belt driving roller 63 and the conveying belt driven roller 64.

The transfer rollers 61 are disposed in the inside of the conveying belt 68 wound around the conveying belt driving roller 63 and the conveying belt driven roller 64, so as to adjacent to and face the photosensitive drums 62 of each image forming unit 20 through the conveying belt 68. The transfer rollers 61 are formed in such a way that the metal roller shaft is covered with the roller portion composed of a conductive elastic member such as a rubber material.

In addition, the transfer rollers 61 are rotatably provided in a counterclockwise direction, so as to rotate in the same direction as an encircling movement direction of the conveying belt 68, in a contact face opposed to and in contact with the conveying belt 68. At transferring, a suitable transfer bias is applied between the transfer rollers 61 and the photosensitive drums 62, in a state of being so controlled as to have constant current in a direction of transferring the toner adsorbed on the surfaces of the photosensitive drums 62 to the recording papers 3.

The fixing unit 8 is disposed on the downstream side of the image forming unit 20 and the transfer unit 17, and in the rear direction of the body casing 5. The fixing unit 8 has a heating roller 81 and a pressing roller 82. The heating roller 81 is composed of a metal element pipe having a parting layer formed on its surface, and has a halogen lamp internally installed along its axial direction. Then, by the halogen lamp, the surface of the heating roller 81 is heated to a predetermined temperature. Also, the pressing roller 82 is disposed so as to press the heating roller 81. Accordingly, while the recording paper having the toner image transferred thereto passes between the pressing roller 82 and the heating roller 81, the toner forming the toner image is heated/pressed and melted, thereby being fixed to the recording paper 3.

Moreover, the paper discharge unit 6 is disposed on the downstream side of the fixing unit 8, and at the rear upper portion in the body casing 5. Then, disposed in the paper discharge unit 6 are a pair of paper discharge rollers 11 for discharging the recording paper 3, on which the toner image is already fixed by the fixing unit 8, to a paper discharge tray 10, and the paper discharge tray 10 disposed on the downstream side of the paper discharge roller 11 on which the recording papers 3 already passed through all the image forming steps are accumulated.

Next, the constitution of the scanner unit will be explained.

FIG. 2 is a schematic sectional view showing an outlined constitution of the scanner unit. As shown in FIG. 2, the scanner unit 100 has a polygon mirror 102 for deflecting the laser beams L to which the photosensitive drums 62M, 62C, 62Y, and 62K for each color are exposed.

FIG. 3 is a schematic plan view showing the constitution of an essential portion in the vicinity of the polygon mirror of the scanner unit. As shown in FIG. 3, in the vicinity of the polygon mirror 102, there are provided semiconductor lasers 103M, 103C, 103Y, and 103K for each color that generate and emit laser beams L, and collimated lenses 104M, 104C, 104Y, and 104K that convert divergent rays generated from each of the semiconductor lasers 103M, 103C, 103Y, and 103K into collimated lights. In the embodiment 1, the semiconductor laser 103C and collimated lens 104C corresponding to cyan (C), and the semiconductor laser 103M and collimated lens 104M corresponding to magenta (M) are arranged to be overlapped in a sub-scanning direction. Also, the semiconductor laser 103Y and collimated lens 104Y corresponding to yellow (Y) and the semiconductor laser 103K and collimated lens 104K corresponding to black (K) are arranged to be overlapped in the sub-scanning direction.

The same reflective surface of the polygon mirror 102 is irradiated with the laser beams L emitted from the semiconductor lasers 103C and 103M at different incident angles, and as shown in FIG. 2, the laser beams L are reflected thereby at different angles in the sub-scanning direction. Also, other same reflective surface of the polygon mirror 102 is irradiated with the laser beams L emitted from the semiconductor lasers 103Y and 103K at different incident angles, and as shown in FIG. 2, the laser beams L are reflected thereby at different angles in the sub-scanning direction. Further, the laser beams L corresponding to the aforementioned yellow (Y) or black (K) are reflected in the direction opposite to the laser beams L corresponding to the aforementioned cyan (C) and magenta (M) by about 180°.

The laser beam L corresponding to magenta (M) or cyan (C) passes through a common fθ lens 121MC. Thereafter, the laser beam L corresponding to magenta (M) is sequentially reflected by mirrors 122M and 123M to pass through a cylindrical lens 124M, and reaches the photosensitive drum 62M. The laser beam L corresponding to cyan (C) passes through the fθ lens 121MC, and is sequentially reflected by mirrors 122C and 123C, then passes through a cylindrical lens 124C and reaches the photosensitive drum 62C. Similarly, the laser beam L corresponding to yellow (Y) or black (K) passes through a common fθ lens 121YK, then is sequentially reflected by mirrors 122Y or 122K, 123Y or 123K, then passes through a cylindrical lens 124Y or 124K, and reaches the photosensitive drum 62Y or 62K.

Next, a constitution and an operation of a control system will be explained.

As described above, the printer 1 performs image forming by subjecting the toner to positive triboelectric charge with an electrophotographic method. Then, by supplying a transfer current to the toner when the toner image is transferred to the recording paper 3, the toner of the toner image is further intensely charged to positive. Accordingly, when the image of gray is formed by three colors of magenta (M), cyan (C), and yellow (Y), and the toner of black (K) is further adsorbed thereon to obtain image of more deep black (K), the problem is involved in this case as follows.

Figure 4A:
FIG. 4A to FIG. 4F are schematic views showing a behavior of toner and a potential distribution when four-color black is formed.
Figure 4B:
Figure 4C:
Figure 4D:
Figure 4E:
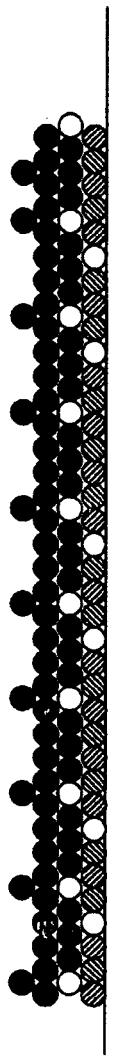
Figure 4F:

FIG. 4A, FIG. 4C and FIG. 4E are schematic views showing the behavior of the toner when four-color black is formed, and FIG. 4B, FIG. 4D and FIG. 4F are graphs schematically showing potential distributions corresponding to FIG. 4A, FIG. 4C and FIG. 4E. In FIG. 4A, FIG. 4C, and FIG. 4E, void circles show the toner of yellow (Y), circles of right-downward slant hatching show the toner of magenta (M), circles of right-upward slant hatching show the toner of cyan (C), and black solid circles show the toner of black (K), respectively.

As shown in FIG. 4A, when the toner of magenta (M), cyan (C), Yellow (Y) are adjacently arranged with relatively larger dots, a potential is set to become higher, as shown in FIG. 4B, at a position where each dot is formed. The toner transferred on the upstream side is charged to an increased charging quantity, because a transfer current is passed to a transfer position of other color. Therefore, the potential of magenta (M), cyan (C), and yellow (Y) are heightened in this order.

Therefore, when the toner of black (K) is further transferred on the three-color black formed by magenta (M), cyan (C), and yellow (Y), as shown in FIG. 4A, the toner of black (K) is flipped by receiving an electrostatic repulsion from the toner of magenta (M), cyan (C), and yellow (Y). The degree of repulsion of the toner of black (K) in this case is most remarkable at a position of magenta (M) having highest potential. Note that when transfer is sequentially performed from yellow (Y), the toner of black (K) is flipped on the toner of yellow (Y) having high lightness, and therefore it becomes highly visible. However, in the embodiment 1, the transfer is sequentially performed from magenta (M) having low lightness, and therefore even if the toner of black (K) is flipped, it does not become highly visible.

Here, as shown in FIG. 4C and FIG. 4E, when the resolution characteristic is improved by fining the dither matrix, as shown in FIG. 4D and FIG. 4F, both of the width and inclination of the potential distribution become smaller. This means that the toner of black (K) is prevented from being flipped. However, when the resolution characteristic is improved, the formation of dots becomes unstable, thus lowering gradation property. Therefore, in the embodiment 1, control is so performed as described below, and the resolution characteristic is improved by switching the dither matrix.

Figure 5:
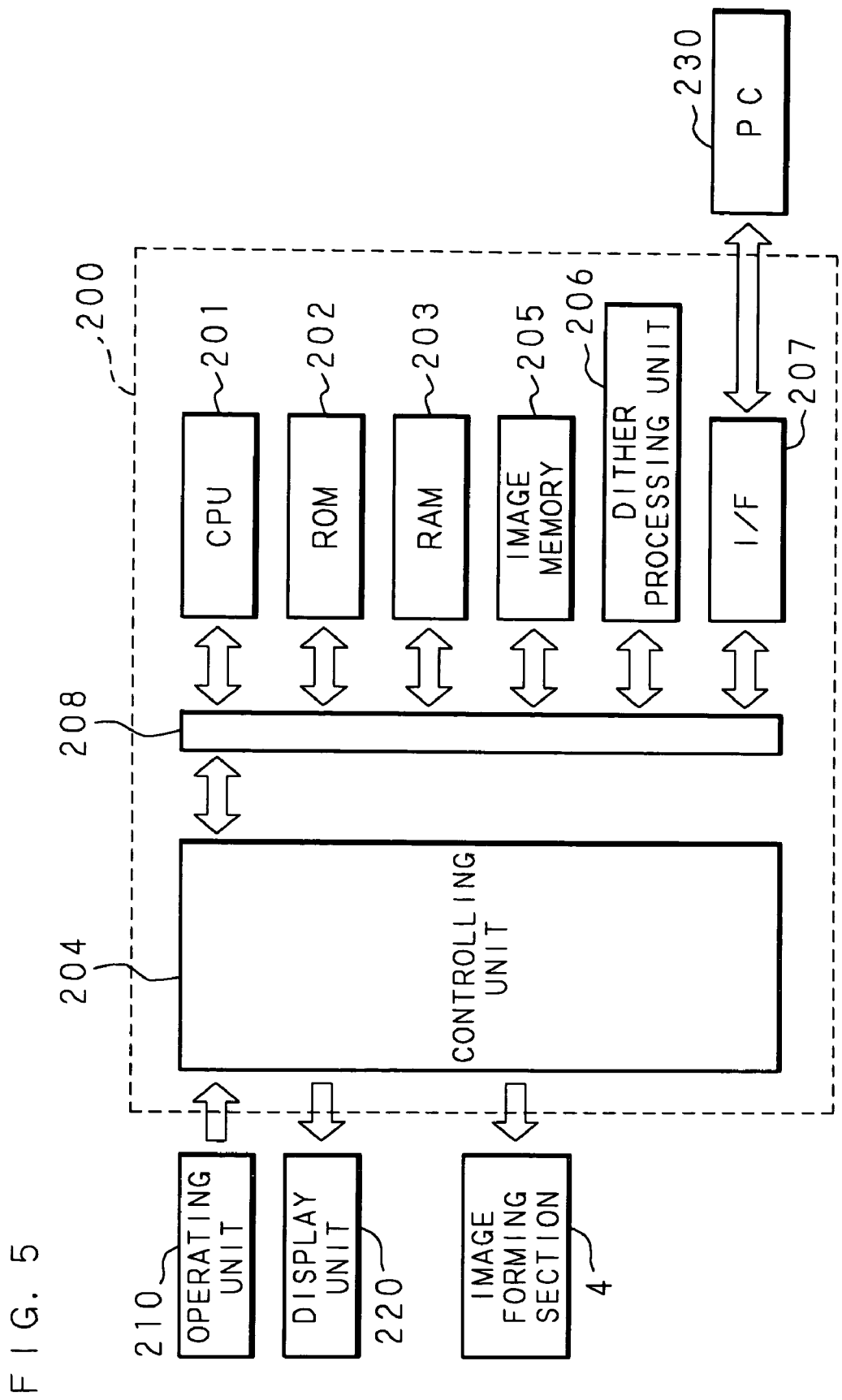
FIG. 5 is a block diagram showing the constitution of a control system of the printer of the embodiment 1 to which the present invention is applied.

FIG. 5 is a block diagram showing the constitution of a control system of the printer 1. As shown in FIG. 5, a control apparatus 200 for controlling the printer 1 is mainly constituted of a micro computer having CPU 201, ROM 202, and RAM 203 as essential portion. Also, the aforementioned image forming section 4, an operating unit 210 provided on the surface of the printer 1, and a display unit 220 are connected to a controlling unit 204 as an ASIC (Application Specific Integrated Circuit). Other than these, the control apparatus 200 includes an image memory 205 for temporarily storing image data, a dither processing unit 206 storing plural kinds of dither matrix, and an interface (I/F) 207 for receiving data from an external personal computer (referred to as an external PC hereafter) 230, and each unit of them are mutually connected, respectively through a buss 208.

Figure 6:
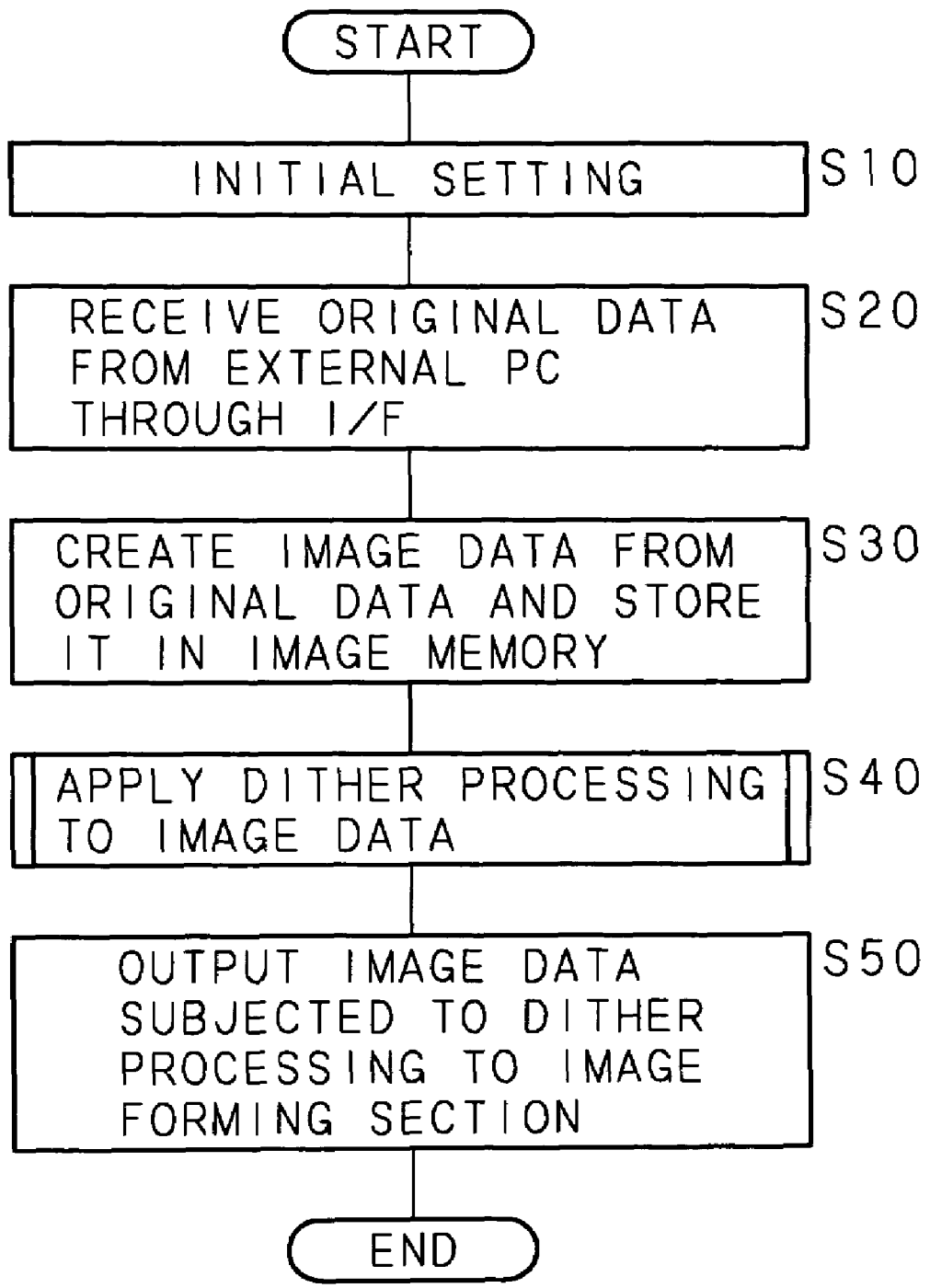
FIG. 6 is a flowchart showing a procedure of image forming processing practiced by a control apparatus of the printer of the embodiment 1 to which the present invention is applied.

FIG. 6 is a flowchart showing the procedure of the image forming processing executed by the control apparatus 200. When an image forming instruction is given from the external PC 230, the control apparatus 200 executes the processing.

When the processing is started, the control apparatus 200 performs each kind of initial setting first in step S10, and in the subsequent step S20, receives original data from the external PC 230 through the interface 207. In the subsequent step S30, the control apparatus 200 creates image data from the original data and stores it in the image memory 205, and applies dither processing to the image data in step S40.

Specifically, the image data created in step S30 is the data expressing the density of each color of magenta (M), cyan (C), yellow (Y), and black (K) by numerical values of 256 steps for each pixel. As will be described later in detail, in step S40, the control apparatus 200 creates data corresponding to ON/OFF of the dot, for the image data. In this way, the image data thus subjected to dither processing is outputted to the image forming section 4 in step S50, and thereafter the processing is ended. As a result, the image forming section 4 drives a semiconductor laser 103 corresponding to each color based on the image data outputted in step S50, and forms an image corresponding to the original data on the recording paper 3.

Figure 7:
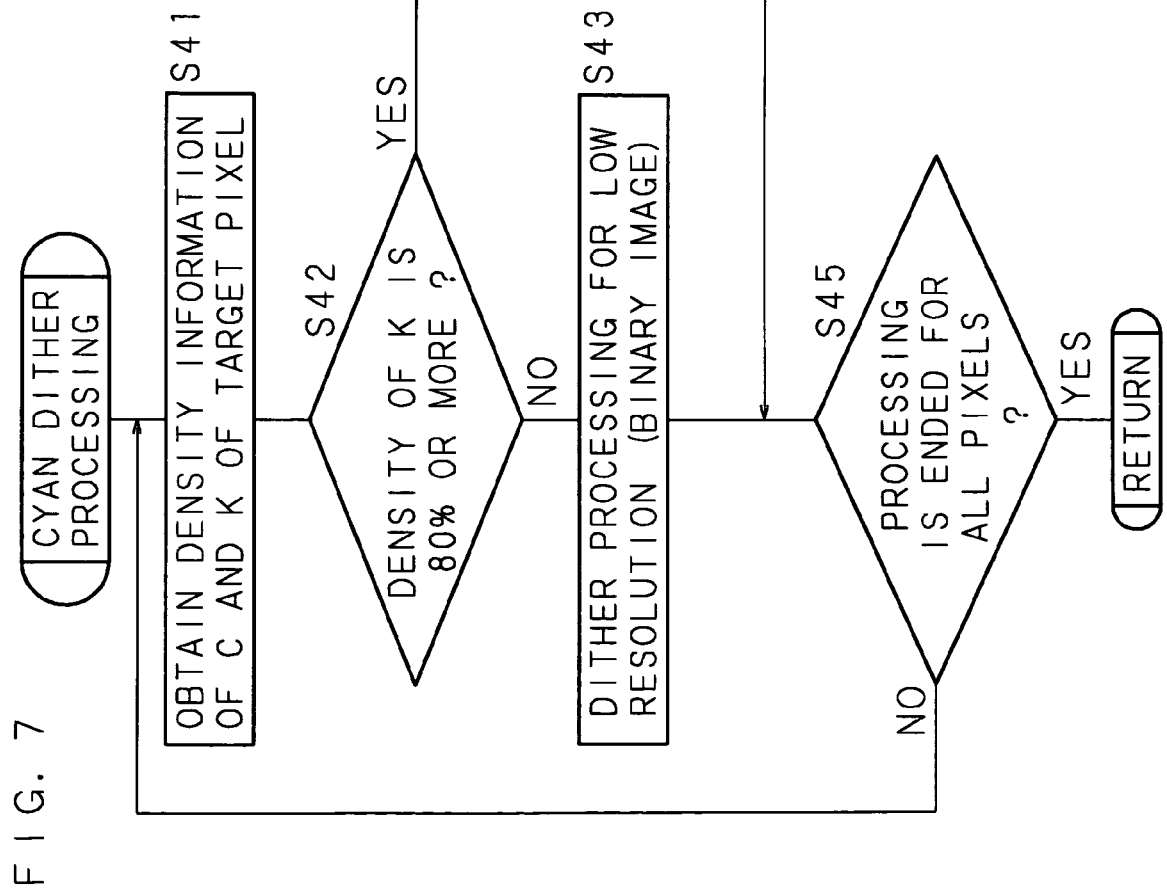
FIG. 7 is a flowchart showing the procedure of cyan dither processing in the image forming processing.

FIG. 7 is a flowchart showing the processing related to cyan (C) out of the dither processing, i.e. the processing of cyan dither processing executed in step S40. Note that the procedure of the dither processing related to other color is the same as the procedure of the cyan dither processing.

In the cyan dither processing, first, the control apparatus 200 obtains density information of cyan (C) and black (K) of a target pixel in step S41. In the subsequent step S42, the control apparatus 200 judges whether or not the density of black (K) is 80% or more. When a judgment result shows the density of under 80% (step S42: NO), the control apparatus 200 performs dither processing for low resolution in step S43. Meanwhile, when the judgment result in step S42 shows the density of 80% or more (step S42: YES), the control apparatus 200 performs dither processing for high resolution in step S44. In any case, after the processing is ended in step S43 or S44, the processing is moved to step S45. In step S45, the control apparatus 200 judges whether or not processing is ended for all pixels. When the processing has not been ended for all pixels yet (step S45: NO), the control apparatus 200 moves the processing to the aforementioned step S41 and executes processing of the aforementioned steps S41 to S44 to the next pixel. Then, when processing of steps S41 to S44 is ended for all pixels, the control apparatus 200 makes the processing return to the aforementioned step S50 (see FIG. 6).

Here, the dither processing for low resolution executed in step S43 and the dither processing for high resolution executed in step S44 will be explained.

Figures 8A, 8B:
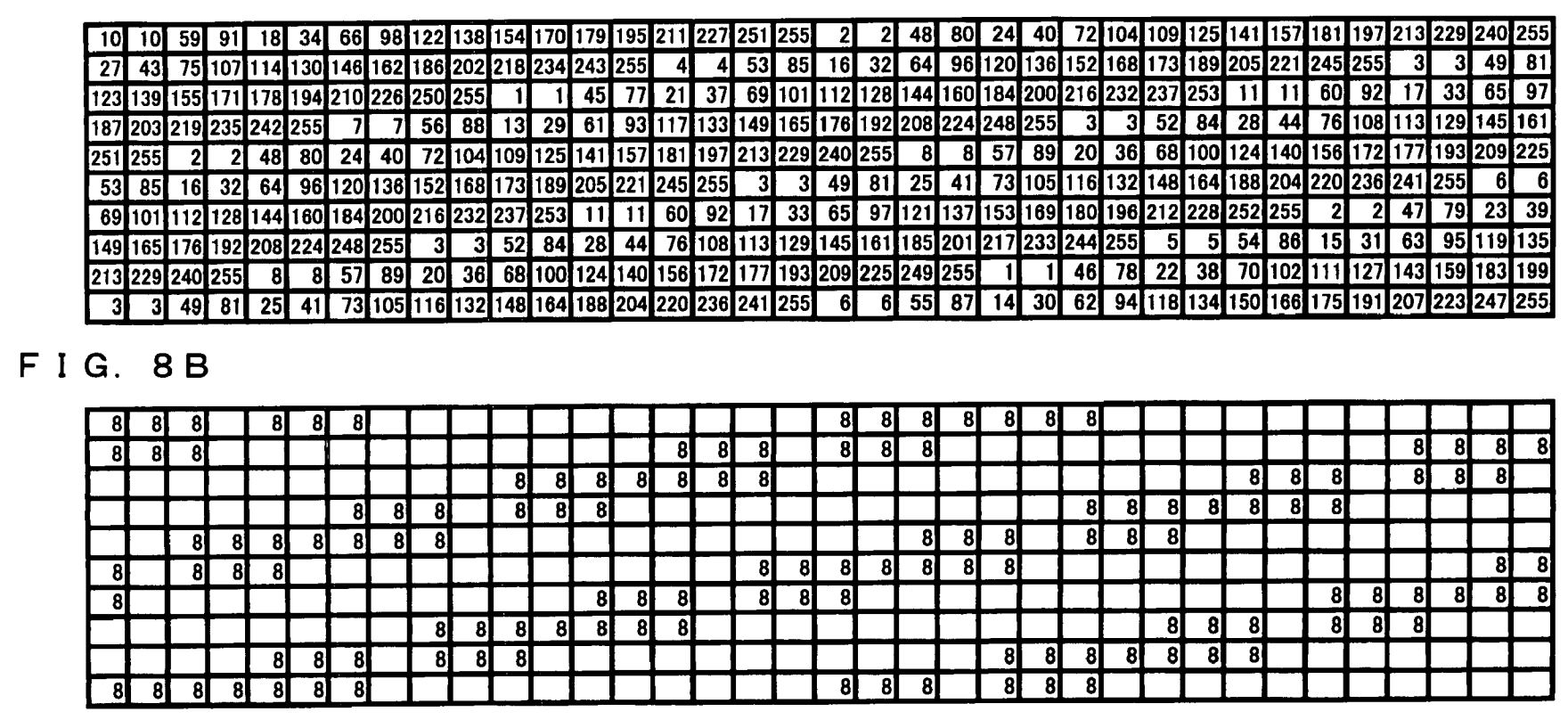

In the dither processing for low resolution, binary image processing is performed. Specifically, the dither matrix as shown in FIG. 8A is used for cyan (C), and ON/OFF of the dots of 600×600 dpi is set. The dither matrix is the matrix of 14° and 137 line, and for example, when the density is 84 out of 256 steps, as shown in FIG. 8B, ON/OFF is set. Specifically, in FIG. 8A, a square, in which numerical value of 84 or less is set, is set at ON. Note that "8" in the square of FIG. 8B shows that all dots are set at ON when the dots of 600 dpi are divided into eight (namely, the dots are not divided into eight).

Figures 9A, 9B:
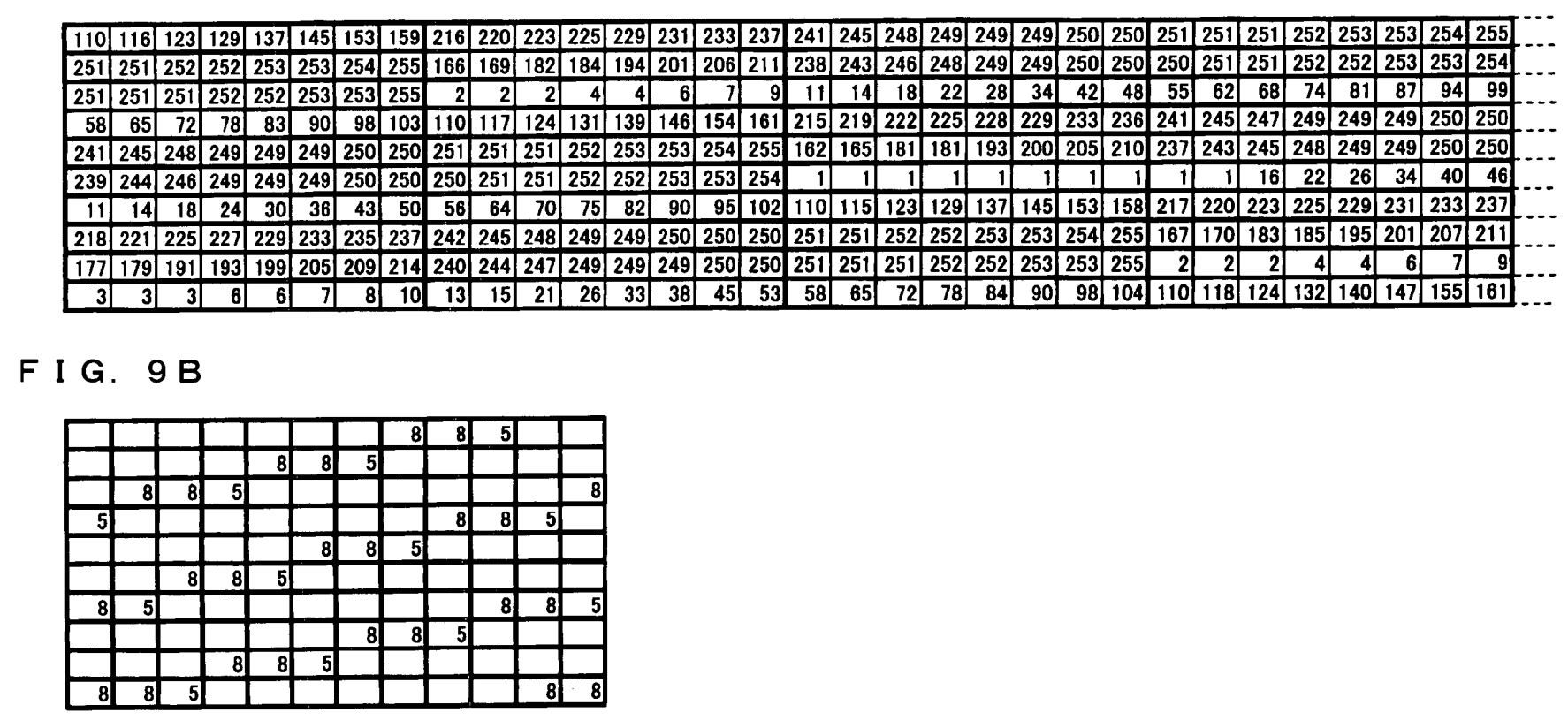

Meanwhile, in the dither processing for high resolution, continuous-tone image processing is performed. Specifically, the dither matrix as shown in FIG. 9A is used for cyan (C), and ON/OFF of the dots of 4800×600 dpi is set. The dither matrix in this case is the matrix of 18.4° and 190 line, and for example, when the density is 84 out of 246 steps, ON/OFF as shown in FIG. 9B is set. Note that "8" in the square of FIG. 9B shows that when the dots of 600 dpi are divided into eight, all the dots are set at ON, and "5" shows that 5 dots out of eight divided dots are set at ON, respectively.

Namely, one square of FIG. 8A corresponds to one square of FIG. 8B, respectively one by one. However, in FIG. 9A and FIG. 9B, lateral eight squares of FIG. 9A and one square of FIG. 9B are corresponded. In addition, although angles are different, almost the same thing as the case of cyan (C) can be said for the dither matrix of magenta (M) and yellow (Y).

In this way, when the dither processing for high resolution is performed, the toner of cyan (C), magenta (M), and yellow (Y) are finely dispersed. Therefore, as shown in FIG. 4E, it becomes possible to prevent the toner of black (K) from being flipped. However, when the high resolution processing is performed and the toner is thereby dispersed, it becomes difficult to stably form the dots, thus deteriorating the gradation property. Therefore, in the embodiment 1, when the density of black is 80% or more, by performing the dither processing for high resolution, the toner of black (K) is prevented from being flipped. On the other hand, when the density of black is under 80%, by applying dither processing for low resolution, the gradation property is secured.

Accordingly, in the embodiment 1, by preventing the toner of black (K) from being flipped and from becoming in a void state, the color close to black such as four-color black can be stably and excellently formed, and an excellent gradation property can be achieved. In addition, in the aforementioned embodiment 1, the control apparatus 200 for executing judgment processing of step S42 corresponds to a judging unit, and the control apparatus 200 for executing dither processing in either of the step S43 or S44 corresponds to a resolution characteristic change unit, respectively.

Modified Example of the Embodiment 1

The present invention is not limited to the above-described embodiment 1, but can be executed in various embodiments not departing from the gist of the present invention. For example, in the aforementioned embodiment 1, switching of the dither matrix is enabled per every one pixel. However, by performing the processing of the steps S42 to S44 by various unit, i.e. per every one job, per every one page, per every one line, or per every one block, the dither matrix may be switched per every one job, per every one page, per every one line, or per every one block. However, as is seen in the embodiment 1, when the processing of the steps S42 to S44 is performed per every one pixel, the toner of black (K) is further excellently prevented from being flipped by the toner of other color, and the gradation property can be further excellently achieved.

Also, in the embodiment 1, although the color other than black (K) such as magenta (M), cyan (C), and yellow (Y) are transferred in this order, yellow (Y), cyan (C), and magenta (M) may be transferred in this order.

Further, in the embodiment 1, black (K) is finally transferred, but the transfer of black (K) may not be necessarily last. In this case, for example, when the toner of other color is transferred on the toner of black (K), there is a possibility that the toner of black (K) is flipped to the circumference in the vicinity of an edge of the image. Accordingly, in this case also, as described before, by switching the dither matrix, the toner of black (K) is prevented from being flipped. However, when black (K) is finally transferred, as shown in FIG. 4A to FIG. 4F, the effect of preventing the toner of black (K) from being flipped is further remarkably exhibited. In addition, in the image forming apparatus of the type using a so-called intermediate transfer member, a similar remarkable effect to that of the embodiment 1 is generated in the case of transferring black (K) first.

Embodiment 2

Next, the embodiment 2 of the present invention will be explained.

Figure 10:
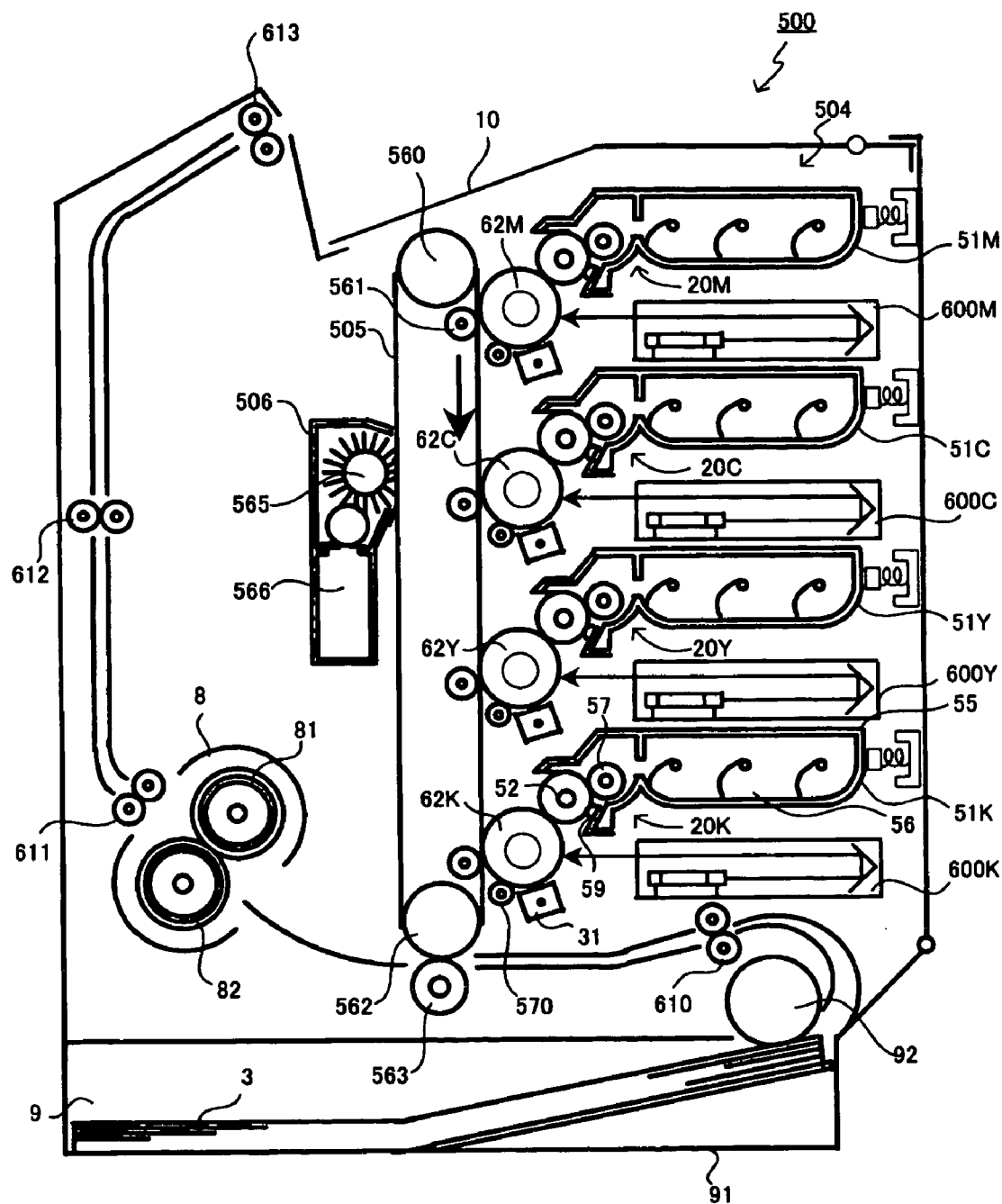
FIG. 10 is a schematic sectional view showing the constitution of the printer when the present invention is applied to the printer of the embodiment 2 of a type using an intermediate transfer member.

FIG. 10 is a schematic sectional view showing the constitution of the printer of an embodiment 2 in the case of applying the present invention to a printer of the type using the intermediate transfer member.

A printer 500 has an image forming section 504, a belt-like intermediate transfer member 505, the fixing unit 8, the paper feeding unit 9, and the paper discharge tray 10. Note that in the printer 500, although the positional relation, and the like, of the paper feeding unit 9, the paper discharge tray 10, and the image forming unit 20 are slightly different, they are similarly constituted as the printer 1. Therefore, the same reference numerals as being used in FIG. 1 are used, and a detailed explanation of the constitution is omitted.

The image forming section 504 of the printer 500 also has the image forming units 20M, 20C, 20Y, 20K for each image forming step by each toner of magenta (M), cyan (C), yellow (Y), and black (K), and scanner units 600M, 600C, 600Y, 600K for each image forming step. In addition, a cleaning roller 570 for removing residual toner on the photosensitive drums 62 by a friction force to the photosensitive drums 62 and an action of an electric field, is provided on the upstream side of the electrifier 31 and on outer circumferences of the photosensitive drums 62 in each image forming unit 20.

In addition, in the normal using condition, the scanner units 600M, 600C, 600Y, 600K are arranged so as to be superimposed on the developing cartridges 51M, 51C, 51Y, 51K of the image forming section 504 in a substantially vertical direction, and are arranged so as to be superimposed on the photosensitive drums 62M, 62C, 62Y, 62K in a substantially horizontal direction. The scanner units 600M, 600C, 600Y, 600K exposes surfaces of the photosensitive drums 62M, 62C, 62Y, 62K by laser beams, respectively. In the same way as the printer 1 of the embodiment 1, the surfaces of the photosensitive drums 62M, 62C, 62Y, 62K are irradiated with laser beams corresponding to the image data, by the scanner units 600M, 600C, 600Y, 600K, and the electrostatic latent images for each color are thereby formed on the surfaces of the photosensitive drums 62M, 62C, 62Y, 62K. The development cartridges 51M, 51C, 51Y, 51K develops each electrostatic latent image formed as described above by a reverse developing method with positively electrified toner.

The belt-like intermediate transfer member 505 is formed by a conductive sheet such as polycarbonate or polyimide into a belt shape. As shown in FIG. 10, the intermediate transfer member 505 is wound around two driving rollers 560 and 562. In the vicinity of a position where the intermediate transfer member 505 faces the photosensitive drums 62M, 62C, 62Y, 62K, intermediate transfer rollers 561 are respectively provided. As shown in FIG. 10, a moving direction of the surface of the intermediate transfer member 505 on the side facing the photosensitive drums 62M, 62C, 62Y, 62K is set in a direction of moving from upside to downside in an almost vertical direction in a state where the printer 500 is normally used.

A predetermined voltage is applied to the intermediate transfer rollers 561, and the toner image formed on the photosensitive drums 62M, 62C, 62Y, 62K are transferred to the intermediate transfer member 505. In addition, a secondary transfer roller 563 is provided at a position where the toner image is transferred to the recording paper 3, specifically on the driving roller 562 located at the lowermost side of the intermediate transfer member 505, so as to face thereto. The predetermined voltage is applied to the secondary transfer roller 563 also. As a result, the toner image of four colors carried on the belt-like intermediate transfer member 505 is transferred to the recording paper 3 between the driving roller 562 and the secondary transfer roller 563.

In addition, as shown in FIG. 10, a cleaner 506 is provided on the opposite side of the side facing the photosensitive drums 62M, 62C, 62Y, 62K of the intermediate transfer member 505. The cleaner 506 is composed of a scraping member 565 and a case 566. The cleaner 506 scrapes off the toner remained on the intermediate transfer member 505 by the scraping member 565, and recovers it in the case 566. Similarly to the case of the printer 1 of the embodiment 1, the fixing unit 8 is composed of the heating roller 81 and the pressing roller 82, and fixes four-color toner image on the recording paper 3.

The recording paper 3 fed from the paper feeding unit 9 by the paper feeding roller 92 is conveyed to a press-contact portion of the intermediate transfer member 505 and the secondary transfer roller 563 by a pair of conveying rollers 610, and sent to the fixing unit 8, with the toner image carried on the intermediate transfer member 505 transferred to the recording paper 3. The recording paper 3 discharged from the fixing unit 8 is further conveyed by conveying roller pairs 611, 612, 613, and discharged to the discharge tray 10.

In this way, in the printer 500 using the intermediate transfer member 505 of the embodiment 2, when the toner of black (K) is finally transferred after each color, there is a high possibility that the toner of black (K) is flipped by the toner of other color already transferred on the intermediate transfer member 505. Also, when the toner of black (K) is transferred first, the toner of black (K) is arranged on the uppermost layer when transferred on the recording paper 3, and therefore there is also a high possibility of being flipped. Accordingly, in the printer 500 of the embodiment 2, even when the toner of black (K) is transferred first or finally, the aforementioned remarkable effect is generated. Note that in the embodiment 2, the intermediate transfer member 505, the intermediate transfer roller 561, and the secondary transfer roller 563 correspond to a transfer unit.

Further, the present invention can be applied to a copying machine, a facsimile apparatus, and the like, other than the printer. In addition, the image carrier may be formed into a belt shape, and the present invention can also be applied to the image forming apparatus of not the tandem type but a so-called four-cycle type. Further, the latent image forming unit may be constituted so as to form the electrostatic latent image by a method other than exposure. Still further, other plurality of colors that make pairs with black may include colors other than magenta, cyan and yellow, and may be constituted by more than three colors including magenta, cyan, and yellow. Still further, as a method of changing the resolution characteristic, of course various methods are possible other than switching of the dither matrix.

As described above in detail, according to the image forming method and apparatus of the present invention, the electrostatic latent image is formed on the image carrier in accordance with the image data corresponding to each color and the resolution characteristic, and by adsorbing the toner of each color on the electrostatic latent image, development is applied to the toner image. When the toner of the toner image thus developed is transferred to the medium (recording paper) to be recorded, the toner of each color is arranged on the medium to be recorded in a predetermined positional relation, and a color image can be formed on the medium to be recorded.

Further, whether or not the density of black is a predetermined value or more is judged, and when it is judged to be the predetermined value or more, the resolution characteristic is changed to a higher resolution characteristic, compared to the resolution characteristic used for the case in which a judgment result shows a value under the predetermined value. As a result, when the density of black is higher, the resolution characteristic is improved, and therefore the toner of black is prevented from being flipped by the toner of other color and from becoming in a so-called void state. Accordingly, the color close to black such as four-color black can be stably and excellently formed. In addition, when the density of black is a value under the predetermined value, the resolution characteristic lower than this value is used, and therefore the dots can be stably formed and an excellent gradation property can be achieved.

In addition, when the change of the resolution characteristic by the resolution characteristic change unit is performed to the image data corresponding to the color other than black, the gradation property of black can be stabilized.

Also, judgment by the judging unit and the change of the resolution characteristic by the resolution characteristic change unit can be performed per various units, i.e. as per every one job, per every one page, per every one line, and per every block. However, when the judgment by the judging unit and the change of the resolution characteristic by the resolution characteristic change unit are performed per every one pixel of the image data, the toner of black can be further excellently prevented from being flipped by the toner of other color, and a further excellent gradation property can be achieved.

Moreover, the present invention absolutely does not limit a transfer order of the toner of each color including black, but the toner of each color adsorbed on the image carrier may be transferred to the medium to be recorded so as to be directly and sequentially overlapped on each other, and the toner of black may be finally transferred to the medium to be recorded after each color. When the toner of black is thus finally transferred after each color, there is a high possibility that the toner of black is flipped by the toner of other color already transferred on the medium to be recorded. Accordingly, in this case, as described before, the advantage of the present invention wherein the toner of black is prevented from being flipped is further remarkably exhibited.

Alternately, the present invention may be so constituted that after plural kinds of toner adsorbed on each image carrier are transferred to the intermediate transfer member once so as to be sequentially overlapped on each other, the plural kinds of toner are transferred to the medium to be recorded from the intermediate transfer member, and the toner of black is firstly or finally transferred to the intermediate transfer member before/after each color. When the toner of black is finally transferred after each color, there is a high possibility that the toner of black is flipped by the toner of other color already transferred on the intermediate transfer member. When the toner of black is firstly transferred, the toner of black is arranged on the uppermost layer when the toner image is transferred to the medium to be recorded, and therefore there is also a high possibility of being flipped. Accordingly, in this case, as described before, the advantage of the present invention wherein the toner of black is prevented from being flipped is further remarkably exhibited.

Moreover, the present invention does not particularly limit a changing method of the resolution characteristic, but the change of the resolution characteristic may be performed by forming plural different patterns by switching the dither matrix.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds there-of are therefore intended to be embraced by the claims.

What is claimed is:

1. An image forming method for forming an image of black by an image forming apparatus which comprises: a latent image forming unit that forms an electrostatic latent image corresponding to each color on an image carrier, in accordance with received image data corresponding to black and a plurality of colors other than black and a predetermined resolution characteristic; a developing unit that adsorbs toner of said each color on the electrostatic latent image formed on said image carrier to develop a toner image; and a transfer unit that transfers the toner adsorbed on said image carrier by said developing unit to a medium to be recorded, comprising the steps of:

judging whether or not a density of black is a predetermined value or more, based on said received image data; and when said judgment result shows that the density of black is said predetermined value or more, changing said resolution characteristic to a higher resolution characteristic compared to the resolution characteristic used in a case in which said judgment result shows that the density of black is a value under said predetermined value, wherein said developing unit adsorbs toner corresponding to at least one of said plurality of colors other than black, which toner corresponding to at least one of said plurality of colors other than black is more finely dispersed compared to the toner corresponding to at least one of said plurality of colors other than black before changing to said higher resolution characteristic.

2. The image forming method as set forth in claim 1, wherein said image forming apparatus is constituted in such a way that by said transfer unit, the toner of said each color adsorbed on the image carrier is transferred on the medium to be recorded so as to be directly and sequentially overlapped on each other, and the toner of black is finally transferred to said medium to be recorded after each color.

3. The image forming method as set forth in claim 1, wherein said image forming apparatus is constituted in such a way that by said transfer unit, after the toner adsorbed on said each image carrier is transferred to the intermediate transfer member once so as to be sequentially overlapped on each other, the toner is transferred to the medium to be recorded from said intermediate transfer member, and the toner of black is firstly or finally transferred to said intermediate transfer member before/after each color.

4. The image forming method as set forth in claim 1, wherein said change of resolution characteristic is performed by switching a dither matrix.

5. The image forming method as set forth in claim 1, wherein said change of resolution characteristic is applied to the image data corresponding to the color other than black.

6. The image forming method as set forth in claim 5, wherein said image forming apparatus is constituted in such a way that by said transfer unit, the toner of said each color adsorbed on the image carrier is transferred on the medium to be recorded so as to be directly and sequentially overlapped on each other, and the toner of black is finally transferred to said medium to be recorded after each color.

7. The image forming method as set forth in claim 5, wherein said image forming apparatus is constituted in such a way that by said transfer unit, after the toner adsorbed on said each image carrier is transferred to the intermediate transfer member once so as to be sequentially overlapped on each other, the toner is transferred to the medium to be recorded from said intermediate transfer member, and the toner of black is firstly or finally transferred to said intermediate transfer member before/after each color.

8. The image forming method as set forth in claim 5, wherein said change of resolution characteristic is performed by switching a dither matrix.

9. The image forming method as set forth in claim 1, wherein said judgment result and said change of resolution characteristic are performed per every one pixel of said image data.

10. The image forming method as set forth in claim 9, wherein said image forming apparatus is constituted in such a way that by said transfer unit, the toner of said each color adsorbed on the image carrier is transferred on the medium to be recorded so as to be directly and sequentially overlapped on each other, and the toner of black is finally transferred to said medium to be recorded after each color.

11. The image forming method as set forth in claim 9, wherein said image forming apparatus is constituted in such a way that by said transfer unit, after the toner adsorbed on said each image carrier is transferred to the intermediate transfer member once so as to be sequentially overlapped on each other, the toner is transferred to the medium to be recorded from said intermediate transfer member, and the toner of black is firstly or finally transferred to said intermediate transfer member before/after each color.

12. The image forming method as set forth in claim 9, wherein said change of resolution characteristic is performed by switching a dither matrix.

13. An image forming apparatus comprising:
a latent image forming unit that forms an electrostatic latent image corresponding to each color on an image carrier in accordance with received image data corresponding to black and a plurality of colors other than black and a predetermined resolution characteristic;
a developing unit that adsorbs toner of said each color on the electrostatic latent image formed on said image carrier by said latent image forming unit to develop a toner image;
a transfer unit that transfers the toner adsorbed on said image carrier by said developing unit to a medium to be recorded;
a judging unit that judges whether or not a density of black is a predetermined value or more, based on said received image data; and
a resolution characteristic change unit that changes said resolution characteristic to a higher resolution characteristic compared to the resolution characteristic used in a case in which said judging unit judges that the density of black is a value under said predetermined value, when said judging unit judges that the density of black is said predetermined value or more,
a controlling unit that controls a dispersion of toner corresponding to said plurality of colors,
wherein said controlling unit controls to disperse toner corresponding to at least one of said plurality of colors other than black, more finely than the toner corresponding to at least one of said plurality of colors other than black before changing to said higher resolution characteristic, and said developing unit adsorbs the finely dispersed toner corresponding to at least one of said plurality of colors other than black, when said resolution characteristic change unit changes said resolution characteristic to said higher resolution characteristic.

14. The image forming apparatus as set forth in claim 13, wherein
by said transfer unit, the toner of each color adsorbed on said image carrier is transferred to the medium to be recorded so as to be directly and sequentially overlapped on each other, and
the toner of black is finally transferred to said medium to be recorded after each color.

15. The image forming apparatus as set forth in claim 13, wherein
by said transfer unit, the toner adsorbed on said each image carrier is transferred to the intermediate transfer member once so as to be sequentially overlapped on each other, the toner is transferred to the medium to be recorded from said intermediate transfer member, and
the toner of black is firstly or finally transferred to said intermediate transfer member before/after each color.

16. The image forming apparatus as set forth in claim 13, wherein the change of resolution characteristic by said resolution characteristic change unit is performed by switching a dither matrix.

17. The image forming apparatus as set forth in claim 13, wherein the change of resolution characteristic by said resolution characteristic change unit is performed to the image data corresponding to colors other than black.

18. The image forming apparatus as set forth in claim 17, wherein
by said transfer unit, the toner of each color adsorbed on said image carrier is transferred to the medium to be recorded so as to be directly and sequentially overlapped on each other, and
the toner of black is finally transferred to said medium to be recorded after each color.

19. The image forming apparatus as set forth in claim 17, wherein
by said transfer unit, the toner adsorbed on said each image carrier is transferred to the intermediate transfer member once so as to be sequentially overlapped on each other, the toner is transferred to the medium to be recorded from said intermediate transfer member, and
the toner of black is firstly or finally transferred to said intermediate transfer member before/after each color.

20. The image forming apparatus as set forth in claim 17, wherein the change of resolution characteristic by said resolution characteristic change unit is performed by switching a dither matrix.

21. The image forming apparatus as set forth in claim 13, wherein judgment by said judging unit and change of resolution characteristic by said resolution characteristic change unit are performed per every one pixel of said image data.

22. The image forming apparatus as set forth in claim 21, wherein
by said transfer unit, the toner of each color adsorbed on said image carrier is transferred to the medium to be recorded so as to be directly and sequentially overlapped on each other, and
the toner of black is finally transferred to said medium to be recorded after each color.

23. The image forming apparatus as set forth in claim 21, wherein
by said transfer unit, the toner adsorbed on said each image carrier is transferred to the intermediate transfer member once so as to be sequentially overlapped on each other, the toner is transferred to the medium to be recorded from said intermediate transfer member, and
the toner of black is firstly or finally transferred to said intermediate transfer member before/after each color.

24. The image forming apparatus as set forth in claim 21, wherein the change of resolution characteristic by said resolution characteristic change unit is performed by switching a dither matrix.

* * * * *